(12) United States Patent
John O. et al.

(10) Patent No.: US 8,157,969 B2
(45) Date of Patent: Apr. 17, 2012

(54) METHOD AND APPARATUS FOR MINIMIZING ACCUMULATION OF POLYMER ON PROCESS EQUIPMENT, ESPECIALLY SAFETY DEVICES

(75) Inventors: Barnett John O., Houston, TX (US); Michael Stanley DeCourcy, Houston, TX (US); Michael W. Hurley, Katy, TX (US)

(73) Assignee: Rohm and Haas Company, Philadelphia, PA (US)

( * ) Notice: Subject to any disclaimer, the term of this patent is extended or adjusted under 35 U.S.C. 154(b) by 1115 days.

(21) Appl. No.: 11/796,100

(22) Filed: Apr. 26, 2007

(65) Prior Publication Data

US 2008/0035466 A1    Feb. 14, 2008

Related U.S. Application Data

(60) Provisional application No. 60/810,066, filed on Jun. 1, 2006.

(51) Int. Cl.
*B01D 1/00* (2006.01)
*B01D 3/00* (2006.01)
*C07C 51/42* (2006.01)
*C07C 67/54* (2006.01)
*B08B 3/00* (2006.01)

(52) U.S. Cl. ............. 203/4; 203/8; 203/9; 203/DIG. 21; 560/218; 562/600; 137/15.06

(58) Field of Classification Search ................. 203/4, 8, 203/9, DIG. 21; 202/158; 562/600; 560/218; 137/15.06, 15.17, 74, 807

See application file for complete search history.

(56) References Cited

U.S. PATENT DOCUMENTS

| | | | |
|---|---|---|---|
| 3,629,113 A | 12/1971 | Gerlicher | |
| 4,369,097 A | 1/1983 | Nezu et al. | |
| 6,409,886 B1 | 6/2002 | Matsumoto et al. | |
| 6,469,201 B1 | 10/2002 | Martin et al. | |
| 6,627,047 B1 * | 9/2003 | Ijiri et al. | 203/49 |
| 6,676,808 B2 * | 1/2004 | Hamamoto et al. | 203/8 |
| 6,878,239 B1 * | 4/2005 | Matsumoto et al. | 203/8 |
| 6,983,758 B2 | 1/2006 | DeCourcy et al. | |
| 7,150,809 B2 * | 12/2006 | Diehl et al. | 203/8 |
| 7,282,118 B2 * | 10/2007 | Mitsumoto et al. | 203/8 |

* cited by examiner

*Primary Examiner* — Virginia Manoharan
(74) *Attorney, Agent, or Firm* — Marcella M. Bodner

(57) ABSTRACT

Accumulation of polymer on equipment, which is in contact with polymerizable material during normal process operation, is minimized by the method and apparatus of the present invention. The method involves positioning and affixing the equipment, such as a pressure relief device, to process apparatus, such as a distillation column, proximate to a wetted region comprising liquid phase fluid in the process apparatus, such that the moving liquid phase fluid is at least intermittently in contact with the equipment and one or more of accumulated polymerizable material, condensate comprising same, and polymer, is washed off of the equipment. The apparatus of the present invention includes: a process vessel having at least one wall forming an interior space which includes at least one wetted region having moving liquid phase fluid therein during operation of a process in the process vessel; and equipment affixed to the wall of the process and positioned proximate to the wetted region such that, during operation of a process in the process vessel, the moving liquid phase fluid at least intermittently contacts the equipment, and one or more of accumulated polymerizable material, condensate comprising same, and polymer, is washed off of the equipment. The method and apparatus of the present invention are effective for maintaining the service-readiness of the equipment, which provides for safe long-term operation of the process apparatus.

5 Claims, 6 Drawing Sheets

METHOD AND APPARATUS FOR MINIMIZING ACCUMULATION OF POLYMER ON PROCESS EQUIPMENT, ESPECIALLY SAFETY DEVICES

CROSS REFERENCE TO RELATED PATENT APPLICATIONS

This is a non-provisional patent application of U.S. provisional patent application Serial Number 60/810,066 filed Jun. 1, 2006.

FIELD OF THE INVENTION

The present invention relates to a method for minimizing accumulation of polymer on process equipment, such as pressure relief devices, during chemical processes such as the production of polymerizable materials, for example, polymerizable monomers including, but not limited to, (meth)acrylic acid and its esters, vinyl chloride, hydrogen cyanide, (meth)acrylonitrile, (methyl)styrene, and other vinyl monomers. More particularly, the present invention relates to a method for preventing accumulation of polymer on process equipment by properly positioning and affixing such process equipment relative to components of other process apparatus and liquid phase fluids, for example, positioning and affixing a safety device proximate to a wetted region in an operating distillation column.

BACKGROUND

Processes for the production of polymerizable materials often involve process equipment on which polymer tends to accumulate during normal process operation. This accumulation often interferes with the proper functioning of the process equipment by locking moving parts in static positions or restricting fluid flow required for proper functioning of the process equipment. Many of these processes involve one or more process fluids, including a liquid phase fluid, which may be used to advantage.

In particular, despite efforts to prevent formation of polymer during purification of polymerizable monomers in separation apparatus, such as a distillation column, the unwanted formation and accumulation of polymer is a common and troublesome occurrence. For example, one type of polymerization, "condensation polymerization" which forms "condensation polymer," is especially troublesome when distilling polymerizable monomers. Monomers known to undergo condensation polymerization during distillation include, but are not limited to: (meth)acrylic acid and its esters, vinyl chloride, hydrogen cyanide, (meth)acrylonitrile, (methyl)styrene, and other vinyl monomers. Condensation polymerization occurs when vapor-phase monomers condense onto equipment surfaces, in the absence of suitable polymerization inhibitor compounds, and then undergo uninhibited polymerization, forming condensation polymer solids. Condensation polymer will continue to accumulate on the equipment surfaces as long as condensation in the process equipment continues unchecked.

A particularly vexing and dangerous problem is the accumulation of polymer on and near safety equipment, such as pressure relief devices. The purpose of pressure relief devices is to minimize damage to process equipment, such as distillation columns when abnormal pressure conditions occur, such as, for example, high pressure (over-pressure) or abnormally low pressure (vacuum) conditions. Pressure relief devices avoid explosion or implosion of process equipment under abnormal pressure conditions by opening a path of fluid communication between the interior and exterior of the process equipment (i.e., a valve will open, a rupture disk will rupture or burst open, a bursting panel will burst), thereby allowing equalization of internal pressure with the ambient pressure.

It is very important to prevent or minimize the accumulation of polymer on and near safety devices, such as pressure relief devices, to ensure their correct and safe operation. For example, the accumulation of polymer in and on mounting connections for pressure relief devices may result in an undesirable seal between the mounting connections and the pressure relief devices, impairing removal and replacement of the safety devices. Additionally, polymer may accumulate upstream and proximate to the safety device, such as on the inner walls of a conduit or recessed region wherein the safety device is positioned. Accumulation of polymer in either area tends to restrict the free flow of process fluid near and to the safety device and may, therefore, prevent the pressure relief from operating properly in response to process fluid pressure. This situation limits the capacity of the pressure relief device and creates an unsafe condition. Polymer may also adhere to the surfaces of the pressure relief devices themselves, preventing them from operating as intended—for example, polymer accumulation may cause relief valves to "stick" in the closed position or may cause rupture disks to fail to open at their intended burst pressure.

When distilling polymerizable monomers in distillation columns having pressure relief devices accumulation of polymer on and near pressure relief devices should be avoided or minimized to ensure their correct and safe operation, thereby also ensuring safe, long-term operation of distillation columns.

One known method for combating condensation polymerization in the vapor-containing regions of process equipment such as storage tanks, reaction kettles, and distillation columns, is to maintain the surface temperature of the equipment above the dew point of the monomer(s) being produced. Jacketing, insulation and electric or steam tracing of process equipment has been shown to be relatively effective in "open-flow" regions, i.e., regions where the vapor-phase monomer can freely flow away from the heated surfaces. This approach is not effective, however, in low flow regions such as proximate to pressure relief device mounting connections, where the monomer vapors may stagnate and become trapped. This situation is further exacerbated when the mounting connection is on the top head of a distillation column, such that the upstream surface of the pressure relief device is oriented horizontally.

Addition of vapor-phase polymerization inhibitors has also been utilized as a means for preventing condensation polymerization inside process equipment, such as distillation columns. Examples of such vapor-phase polymerization inhibitors include, but are not limited to, sulfur dioxide ($SO_2$) used in hydrogen cyanide production processes, and one or more salts of N-nitrosophenylhydroxylamine (NPH) such as the ammonium salt, used in (meth)acrylic acid production processes. The efficacy of adding vapor-phase polymerization inhibitors, however, is limited because the fluid present in low flow regions, such as near nozzles, or in interior corners, is essentially stagnant and, therefore, poor mixing occurs and the inhibitors tend not to flow into these regions, whereby polymer formation and accumulation may proceed virtually unabated.

Another method for combating condensation polymerization in monomer distillation columns is using of internal spray devices to spray liquid on interior surfaces of process equipment, thereby washing away condensate before polymerization can occur. U.S. Pat. No. 6,409,886 B1 discloses a spraying and supplying means positioned inside a distillation column which sprays liquid on interior surfaces of the distillation column, with the intent of inhibiting polymer formation. By design, however, this type of spray device is most effective in minimizing polymer formation in large, open-flow regions, such as the top head of a distillation column or storage tank. This approach fails, however, to adequately prevent the accumulation of material in small, low-flow regions, such as the pressure relief device mounting connections on the top head of the column and on the opposite-facing surfaces of process apparatus. This is because the spray devices tend to be installed such that the direction of spray flow is downward, obliquely downward, or maybe even sideways, but rarely upward and always linear. In such circumstances, surfaces above the spray devices are often not sprayed with liquid. Similarly, the surfaces of process equipment that do not at least partially face the spray device are not sprayed with liquid. As mentioned below, additional spray devices may be used, but this approach introduces other difficulties.

In those cases where accumulations must also be prevented on or near small process connections, such as vessel nozzles and valves, U.S. Pat. No. 6,409,886 B1 further suggests that one or more spray nozzles may be employed to specifically spray these connections. However, the installation of the spray nozzle is mechanically complex as well as invasive to the vessel, requiring penetration of the vessel at a separate place on the vessel wall, and the positioning of the line(s) inside the vessel for supplying the liquid to the spray nozzle. With this approach, the elevation and alignment of the spray nozzle itself, as well as the flow rate and spray pattern, are critical and, in practice, it is quite difficult to obtain the proper combination of these variables such that polymer accumulation is wholly prevented. While the effectiveness of such an arrangement could be improved through the use of multiple spray nozzles and an overwhelmingly large quantity of liquid spray, such an approach is costly and impractical in commercial operations. Another limitation of this approach is that it requires a continuous supply of flushing fluid to operate as intended. If there is a significant interruption in the supply of flushing fluid, the benefit of the disclosed apparatus and method may not be maintained and the service-readiness of the pressure relief device may be compromised.

Additionally, the physical presence of the spray nozzle(s) and its supply line(s) create an undesirable obstruction in the process connection, thereby interfering with the free flow of material through the attached pressure relief device, as well as providing additional surfaces on the components themselves for the accumulation of condensation polymer. In some instances, the direct impingement of pressurized spray liquid on the relief device may also cause mechanical fatigue, thereby shortening the service life of the device and leading to premature failures. While the apparatus and method disclosed in U.S. Pat. No. 6,409,886 resolve many problems of the prior art, because of the above-stated limitations, this apparatus and method are impractical when applied, for example, to the small, low flow regions that lie upstream of pressure relief devices in distillation columns.

Thus, there remains a long-felt need to provide a simplified, reliable, inexpensive and effective method for minimizing accumulation of polymer and condensation of polymerizable materials on process equipment, such as pressure relief devices, thereby ensuring the service-readiness of the pressure relief devices while in use in process apparatus during production of polymerizable monomers. It would be desirable to employ a more foolproof, passive approach to preventing the accumulation of polymer on and near pressure relief devices. The method of the present invention overcomes the deficiencies of the prior art, while meeting the need of the chemical process industries for a method of safely distilling polymerizable monomer.

SUMMARY OF THE INVENTION

One embodiment of the present invention is a method for minimizing accumulation of polymer on equipment to be used with process apparatus to operate a process which comprises polymerizable material and at least one process fluid comprising a moving liquid phase fluid, wherein said process apparatus has at least one wall forming an interior space for retaining the at least one process fluid therein, and wherein said equipment is at least intermittently in contact with said polymerizable material, said method comprising: (a) locating a wetted region in which said moving liquid phase fluid is in motion in said interior space of said process apparatus, during operation of the process; (b) causing said moving liquid phase fluid to at least intermittently contact at least a portion of said equipment by positioning and affixing said equipment to said wall of said process apparatus in fluid communication with said interior space and proximate to said wetted region; (c) operating the process, whereby said moving liquid phase fluid washes one or more of accumulated polymerizable material, condensate comprising same, and polymer, off of said equipment.

The equipment may comprise a safety device, which may be at least one pressure relief device selected from the group consisting of: a rupture disk, a rupture panel, and a relief valve. The process apparatus may comprise a separations vessel selected from the group consisting of a distillation column, an absorption column, an evaporator, reboiler, a conduit, a scrubber, and a vertical column. The process may be a process for producing polymerizable material, which may, in turn, comprise at least one polymerizable monomer selected from the group consisting of: (meth)acrylic acid, vinyl chloride, (meth)acrylic acid esters, hydrogen cyanide, (meth)acrylonitrile, (methyl)styrene, vinyl monomers, and (meth)acrylic esters.

Another embodiment of the present invention is an apparatus for minimizing accumulation of polymerizable material on equipment affixed to said apparatus during use of said apparatus to operate a process comprising polymerizable material and at least one process fluid comprising moving liquid phase fluid, said apparatus comprising: (a) a process vessel having at least one wall forming an interior space for retaining the at least one process fluid therein, and during operation of the process, said interior space comprises at least one wetted region comprising said moving liquid phase fluid; (b) equipment affixed to said wall of said process, in fluid communication with said interior space, and positioned proximate to said wetted region such that, during operation of the process, said moving liquid phase fluid is at least intermittently in contact with said equipment such that one or more of accumulated polymerizable material, condensate comprising same, and polymer, is washed off of said equipment.

The equipment may comprises a safety device comprising at least one pressure relief device selected from the group consisting of: a rupture disk, a rupture panel, and a relief valve. The process apparatus may comprise a separations vessel selected from the group consisting of a distillation column, an absorption column, an evaporator, reboiler, a conduit, a scrubber, and a vertical column. The process may be a process for producing polymerizable material, which comprises at least one polymerizable monomer selected from the group consisting of: (meth)acrylic acid, vinyl chloride, (meth)acrylic acid esters, hydrogen cyanide, (meth)acrylonitrile, (methyl)styrene, vinyl monomers, and (meth)acrylic esters.

In a third embodiment, the present invention is a method for minimizing accumulation of polymer during operation of a process which comprises polymerizable material and at least one process fluid comprising a moving liquid phase fluid, said method comprising operating said process using the aforesaid apparatus which comprises: (a) a process vessel having at least one wall forming an interior space for retaining the at least one process fluid therein, and during operation of the process, said interior space comprises at least one wetted region comprising said moving liquid phase fluid; (b) equipment affixed to said wall of said process, in fluid communication with said interior space, and positioned proximate to said wetted region such that, during operation of the process, said moving liquid phase fluid is at least intermittently in contact with said equipment such that one or more of accumulated polymerizable material, condensate comprising same, and polymer, is washed off of said equipment.

BRIEF DESCRIPTION OF THE DRAWINGS

A more complete understanding of the present invention will be gained from the embodiments discussed hereinafter and with reference to the accompanying drawings, in which like reference numbers indicate like features, and wherein.

DETAILED DESCRIPTION OF THE INVENTION

Figure 1:
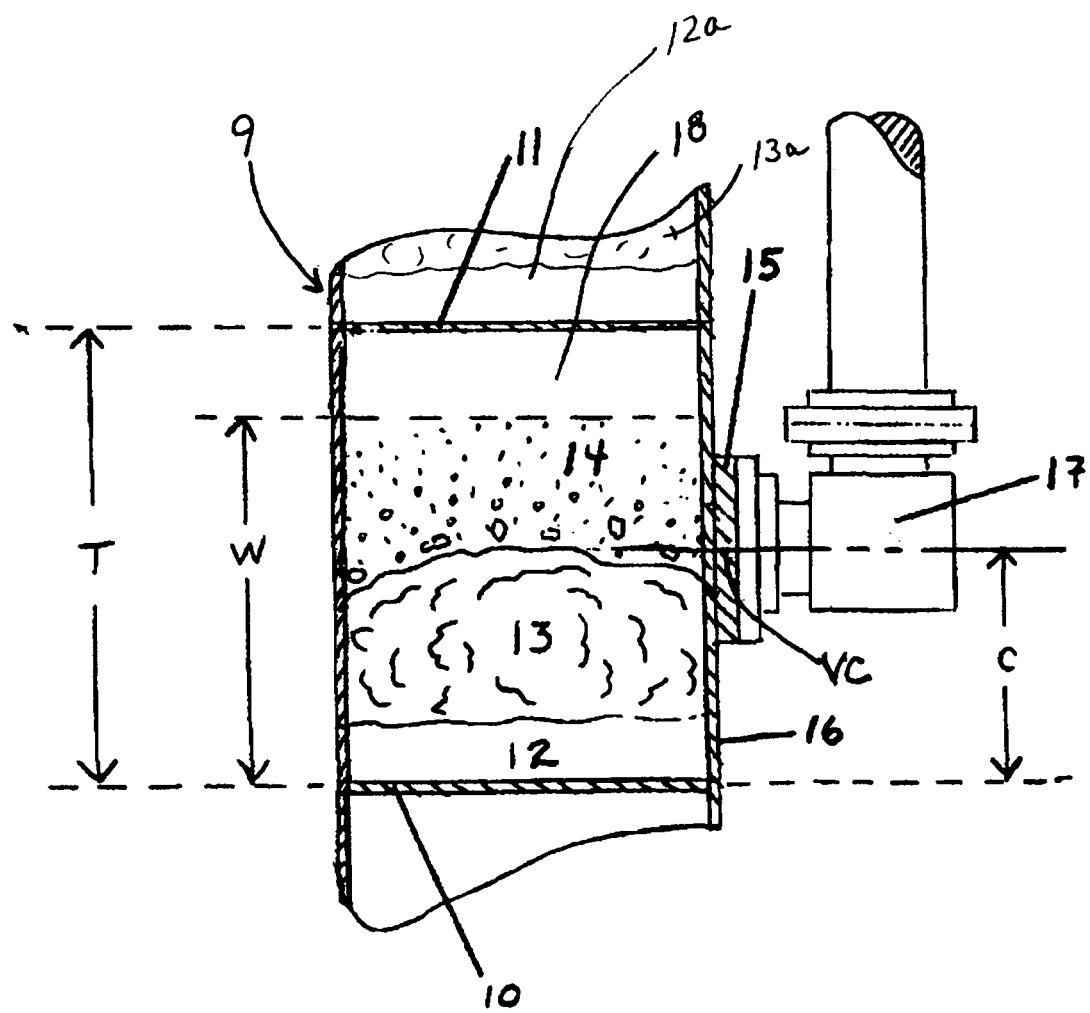
FIG. 1 is a schematic, partially cut-away elevational side view of a portion of a distillation column in operation, showing the wetted region and relative positioning of a safety device in accordance with the present invention.

The method and apparatus of the present invention address the need to minimize accumulation of polymer on process equipment, such as safety devices, which are in service in processes which comprise polymerizable material and at least one liquid phase fluid in motion, to ensure the continued proper functioning of the equipment and the continued safe operation of the processes and process apparatus. The accumulation of polymer on process equipment has the potential to interfere with, or even entirely prevent, the safe and intended functioning of process equipment, especially equipment having moving or flexible parts. Polymer accumulation on the equipment may be minimized by positioning the equipment, relative to moving liquid phase fluid, such that the liquid phase fluid at least intermittently contacts at least a portion of the surface of the equipment and washes polymerizable material, condensate, and any already-formed polymer, off of the equipment during operation of the process. In addition, the presence of polymerization inhibitors in the moving liquid phase fluid may enhance the washing effect of the moving liquid phase fluid. The apparatus of the present invention comprises any process apparatus, such as a distillation column, for operating a process therein and which has process equipment, such as a pressure relief device, affixed thereto in a position where, during operation of the process, liquid phase fluid will at least intermittently contact the process equipment.

Persons of ordinary skill in the relevant arts will recognize that many types of process apparatus and many processes comprising polymerizable material and moving liquid phase fluid, would benefit from, and be improved by, application of the method and apparatus of the present invention. Without intending to limit the processes to which the present invention would be successfully applicable, the following detailed description will focus on minimizing accumulation of polymer on safety equipment affixed to separations apparatus being used in a process for purification of polymerizable monomers, in particular, pressure safety devices affixed to a distillation column.

The "moving liquid phase fluid" may comprise any liquid phase fluid present and moving in process apparatus during operation of the process. By "moving" it is meant that, during operation of the process, the liquid phase fluid is at least partially in motion, i.e., not stagnant, in a region where, if process equipment is positioned proximate that region, it will be at least intermittently contacted by the liquid phase fluid. The moving liquid phase process fluid may comprise liquid fluid that is inert to the process, or one or more fluids that participate in any way in the process, or a combination of these.

The polymerizable materials may be, for example, without limitation, polymerizable monomers such as, (meth)acrylic acid, vinyl chloride, (meth)acrylic acid esters, hydrogen cyanide, (meth)acrylonitrile, (methyl)styrene, and other vinyl monomers, as well as (meth)acrylic esters. The (meth)acrylic esters may be, but are not limited to, methyl(meth)acrylate, ethyl(meth)acrylate, isopropyl(meth)acrylate, butyl(meth)acrylate, n-propyl(meth)acrylate, isobutyl(meth)acrylate, n-butyl(meth)acrylate, 2-ethylhexylacrylate, 2-hydroxyethyl(meth)acrylate, hydroxypropyl(meth)acrylate, and dialkylaminoethyl(meth)acrylates.

As used herein, the term "(meth)acrylic acid" is understood to encompass both acrylic acid and methacrylic acid. Likewise, the term "acrylic acid" is understood to encompass "(meth)acrylic acid" and related/like compounds. Similarly, "(meth)acrylonitrile" is understood to encompass both acrylonitrile and methacrylonitrile. The recitation "methacrylonitrile" encompasses acrylonitrile and the reverse is also true. "(Methyl)styrene" follows the same pattern. "(Methyl)styrene" encompasses both styrene and methylstyrene. The recitation "styrene" encompasses methylstyrene and the reverse is also true.

It is well within the ability of persons having ordinary skill in the relevant art to determine and select pressure relief device(s) suitable or required for a given process apparatus, such as a distillation column which is operated to purify polymerizable monomers. This includes, but is not limited to, calculating the required relief area, the set pressure, and the number of relief devices required to protect the column from over-pressure and/or under-pressure conditions.

With reference now to the figures, one representative embodiment of the apparatus and method of the present invention will now be discussed in detail. FIG. 1 provides a partially cut-away, schematic representation of process apparatus 8, i.e., a distillation column 9, during normal operation, and shows a moving liquid phase fluid which forms a wetted region and the relative positioning of a safety device assembly 17 in accordance with the present invention. A portion of the exterior vertical wall 16 of the distillation column 9 is cut away to show, schematically, the phases and layers (zones) of fluid which exist in the column 9 during normal operation. The phases and layers of fluid, including the wetted region, will be discussed in greater detail hereinafter.

More particularly, FIG. 1 shows process apparatus, comprising a distillation column 9 having a vertical wall 16 (only a section of which is shown); and a plurality of trays 10, 11, such as, for example, without limitation, more than ten trays. The trays 10, 11 of each pair of adjacent trays 10, 11 are positioned at a distance, T, apart, which is conventionally known in the art as the "tray spacing". In the embodiment shown in FIG. 1, the tray spacing, T, is constant at 60 inches (152.40 centimeters) for all of the trays (not shown) throughout the column 9. It is noted, however, that the tray spacing T need not be constant for each pair of adjacent trays, depending on the design and use of the column 9, as will be understood by persons of ordinary skill in the relevant art.

Between each pair of adjacent trays, such as trays 10 and 11 in FIG. 1, under normal operating conditions, fluid undergoing distillation will generally form what is conceptually referred to in the art as a plurality of horizontal layers or zones, comprising vapor, liquid and mixed phases, as well as various compositions. The nature and arrangement of these zones are well-understood by persons of ordinary skill in the art, but will now, nonetheless, be briefly explained hereinafter to facilitate further discussion using terminology common in the art. It should be understood that, since these zones are conceptual, there are no clear, crisp identifiable boundaries between them, but rather, for practical reasons, the boundaries and elevations of the zones are approximated.

As shown in FIG. 1, under normal operating conditions, tray liquid 12 accumulates on the upper surface of tray 10 and, in fact, tray liquid 12 will similarly accumulate on the upper surface of each tray (not shown) in the distillation column 9. Vapor phase fluid 18 tends to accumulate underneath the adjacent upper tray 11. Normal interaction of vapor and liquid phase fluids in between each adjacent pair of trays 10, 11 results in formation of what is conceptually described as intermediate layers of fluid, having mixed phases, which are intermediate the tray liquid 12 and the vapor phase fluid 18. More particularly, vapor and liquid phase fluids are both present in a turbulent froth zone 13, which forms adjacent to and above the tray liquid 12. A spray zone 14 forms adjacent to and above the turbulent froth zone 13, and below the vapor phase fluid 18, and comprises kinetic liquid droplets and vapor phase fluid. Such liquid terminology is known to persons of ordinary skill in the relevant art and is described in *Distillation Design*, Kister, Henry Z., 1992, McGraw-Hill, Chapter Six (all) pp 259-363 (ISBN 0-07-034909-6).

The term "wetted region" generally refers to the region above a given tray within the distillation column wherein, under normal operating conditions, at least some liquid phase fluid is routinely present. For example, the wetted region above the tray 10 is illustrated schematically in FIG. 1 and will now be described in further detail. Taken together, the volume above each tray, such as tray 10, which comprises the tray liquid 12, the froth zone 13 and the spray zone 14, is referred to herein as the "wetted region" (12, 13, 14, collectively, in FIG. 1), since at least a portion of each of these regions comprises liquid phase fluid. With further reference to FIG. 1, it is noted that the total vertical extent W of the wetted region (12, 13, 14) is from the upper surface of tray 10 to the upper edge of spray zone 14. Furthermore, the volume of the wetted region extends horizontally in all directions above the tray 10, substantially filling the full diameter of the column 9.

Typically, under normal distillation operating conditions where the trays 10, 11 are perforated plates with downcomers (not shown in FIG. 1, but discussed in detail hereinafter in connection with FIG. 7), the total vertical extent W of the wetted region above any particular tray (such as tray 10) is not more than about 80% of the tray spacing T, measured vertically from the upper surface of the tray 10. For example, in the distillation column 9 shown in FIG. 1, wherein the tray spacing T, between consecutive trays 10, 12, is 60 inches (152.40 centimeters), the wetted region extends vertically W from the upper surface of tray 10, to a point about 48 inches (121.92 centimeters) above the upper surface of tray 10. If desired, one may verify the exact upper-bound elevation of the wetted region by visual observation of the tray dynamics under normal operating conditions by, for example, observing the tray through a sight glass, or using an internally mounted camera.

As will be recognized by persons of ordinary skill in the art, when the trays 10, 11 are dual-flow trays (i.e., perforated plates without downcomers - not shown), the vapor phase fluid 18 fails to develop during normal operation of the distillation column 9 and, instead, the spray zone 14 comprises a larger area in the column 9 and expands upward, substantially up to the underside of the upper tray 11. In this arrangement, the wetted region still comprises the tray liquid 12, the froth zone 13 and the spray zone 14, but this area encompasses substantially all of the vertical distance of the tray spacing T. In other words the vertical extent W of the wetted region is approximately the same as the tray spacing T when the distillation trays, 10, 11 and perforated plates without downcomers. Since the spray zone 14 over the lower tray 10 extends substantially up to the underside of upper tray 11, the liquid phase fluid in the spray zone 14 at least intermittently contacts the underside of upper tray 11 and, at least intermittently, washes polymer and condensate therefrom. Additionally, it has been observed that the tray liquid 12a on the upper tray 11 tends to flow through the perforations of the upper tray 11 but is not entrained into a mixed phase or vapor phase zone as quickly, whereby the tray liquid 12a will at least intermittently contact the underside of upper tray 11 and thereby, at least intermittently, wash polymer and condensate therefrom.

In the embodiment of FIG. 1, the distillation column 9 further comprises a mounting connection 15 for mounting a safety device, such as a pressure relief device assembly 17, which will be discussed hereinafter. The mounting connection 15 is affixed in a pressure-tight, secure manner, such as by welding or other conventional means, to the vertical wall section 16 of the distillation column 9, proximate to a wetted region above a tray, such as the wetted region (12, 13, 14) above the tray 10. More particularly, the mounting connection 15 is affixed, in a substantially vertical orientation, at a mounting elevation C above the upper surface of the tray 10, such that the vertical center VC of the mounting connection 15 is positioned proximate to the mounting elevation C, which positions the mounting connection 15 proximate to, and within the vertical extent W of, the wetted region above the tray 10 (see FIG. 1). As used herein, the term "substantially vertical orientation" means oriented at an angle of between about 45 degrees and 90 degrees relative to horizontal. By contrast, the term "substantially horizontal" means oriented at an angle of between 0 degrees and about 44 degrees to relative horizontal.

Depending on the particular process and equipment involved, as is readily determinable by persons of ordinary skill in the art, the mounting elevation C and the vertical center VC of the mounting connection 15, may be positioned at a vertical distance C from the upper surface of the tray 10 of between 15% and 75% of the tray spacing T. For example, without limitation, the mounting elevation C and the vertical center VC of the mounting connection 15 may be positioned at a vertical distance from the upper surface of the tray 10, said distance-being equivalent to about 25%, or about 50%, or even about 60%, of the tray spacing T.

For example, in this first embodiment of FIG. 1, the mounting elevation C is a vertical distance of about 30 inches (76.2 centimeters) from the upper surface of the tray 10, which is about 50% of the tray spacing T. The mounting connection 15 is positioned and affixed to the vertical wall section 16 so that the vertical center VC of the mounting connection 15 is proximate to the mounting elevation C and, therefore, also positioned at a vertical distance of about 30 inches (76.2 centimeters) from the upper surface of the tray 10, which is about 50% of the tray spacing T. Thus, the mounting connection 15 is positioned proximate to, and within the vertical extent W of, the wetted region above the tray 10.

In some instances, the mounting connection 15 may have a substantially circular cross-section and may also comprise a uniform internal diameter D. In such embodiments, the mounting elevation C may be located at a vertical distance above the upper surface of the tray 10 that is between about one and four times the internal diameter D of the mounting connection 15 (as represented by formula: $D \leq C \leq 4D$). For example, in one embodiment wherein the mounting connection 15 is a standard circular studding outlet with a nominal internal diameter of 8 inches (20.32 centimeters), the mounting connection may be positioned above the topmost tray of the distillation column. In this case, the centerline of the mounting connection is positioned at an elevation equivalent to 1.5 diameters (1.5D), or about 12 inches (30.48 centimeters), above the upper surface of the tray.

As mentioned earlier, a safety device, such as the pressure relief device assembly 17 shown in FIG. 1, is attached to the mounting connection 15 in a pressure-tight manner, using conventional means, such as, a gasket and bolts, to achieve a pressure-tight seal. Various alternative attachment means which are well-known in the art may be employed to connect the pressure relief device assembly 17 to the mounting connection 15 in a pressure-tight manner, including, but not limited to one or more of the following: welds, brackets, clips, clamps, compression fittings, threads, disc holders, flanges, tabs, gaskets, bolts, threaded retaining rings, mounting connection inserts. The pressure relief device assembly 17 may be any commercially available or other pressure relief device assembly.

The pressure relief device assembly 17 comprises at least one pressure relief device (not shown in FIG. 1, but see, for example, FIGS. 3-9 and the accompanying text). In accordance with the method of the present invention, the pressure relief device may be one or more devices selected from: relief valves, rupture discs (also known as rupture disks or bursting disks), pressure relief panels, and rupture pin relief valves. Such pressure relief devices, and others, suitable for use with the method of the present invention are commercially available from many sources including, but not limited to: BS&B Safety Systems, of Tulsa, Okla.; Fike Corporation, of Blue Springs, Mo.; Oseco, of Broken Arrow, Okla.; Rupture Pin Technology, of Oklahoma City, Okla.; Continental Disc Corporation, of Liberty, Mo.; and Groth Corporation, of Stafford, Tex.

When the pressure relief device assembly 17 is connected to the mounting connection 15, and the mounting connection 15 has been positioned and affixed to the vertical wall section 16 of the distillation column 9 as described above, such that the vertical center VC of the mounting connection 15 is proximate to the mounting elevation C, then the vertical center of at least one of the pressure relief devices will be positioned proximate to the vertical center VC of the mounting connection 15 and to the mounting elevation C. For example, without limitation, the vertical center of at least one of pressure relief devices may be positioned concentrically with at least one or both of the vertical center VC of the mounting connection 15 and the mounting elevation C.

As can be seen from FIG. 1, in accordance with the method of the present invention, the foregoing method of positioning, orienting, and affixing the mounting connection 15, pressure safety device assembly 17, and pressure safety device (not shown) to the distillation column 9 relative to the wetted region above the tray 10, positions the these devices proximate to the wetted region and within the vertical extent W of the wetted region. Such positioning allows at least a portion of the moving liquid phase fluid in the wetted region above tray 10 to come into contact with the exposed surfaces of the relief device (not shown) and wash away any polymerizable material, condensate, and already-formed polymer.

It is noted that the method of the present invention is applicable to distillation columns wherein normal operating conditions result in the formation of a wetted region, i.e., a moving liquid phase fluid, such as distillation columns which comprise, for example, without limitation, perforated plate trays, including sieve trays and dual flow trays, as well as bubble cap trays and valve trays. Where the formation of moving liquid phase liquid (for example, a wetted region above a distillation tray in a distillation column) does not occur, or is insufficient in volume or flow, the method of the present invention may not perform optimally.

Thus, the method of the present invention minimizes accumulation of polymer on equipment, such as safety devices used in a distillation column for the purification of polymerizable material, by connecting the safety device to a mounting connection which is affixed to the wall of the distillation column and positioned in a substantially vertical orientation, and having the vertical center VC of the mounting connection 15 being positioned proximate to a mounting elevation C which is located within the wetted region above a tray of the distillation column.

Figure 2:
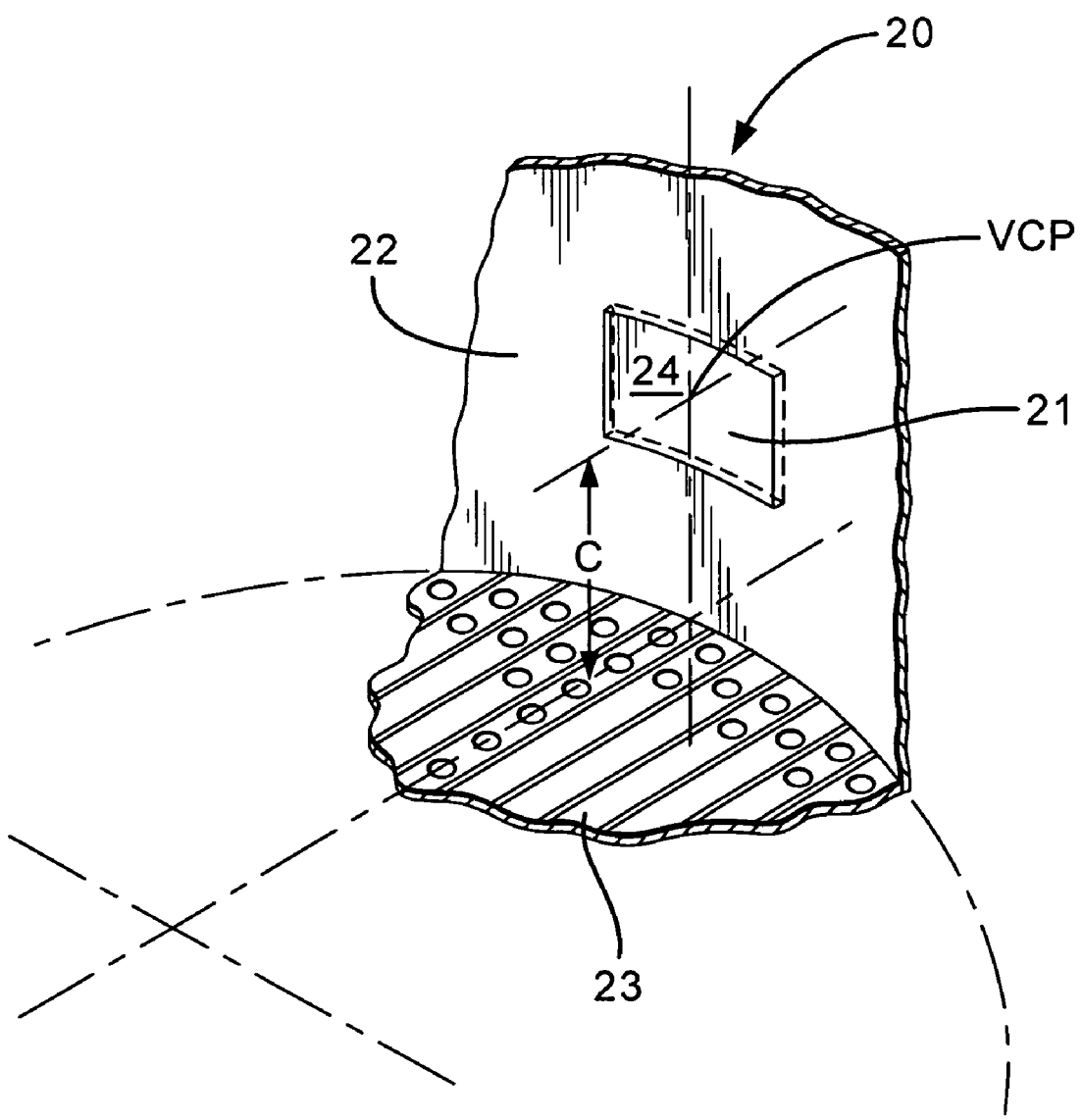
FIG. 2 is a schematic, cut-away oblique view of an alternative embodiment of the present invention, having a distillation column and another type of safety device positioned in accordance with the present invention.

FIG. 2 shows an alternative embodiment of the present invention involving a different type of safety device, i.e., comprising a rupture panel 24, which will now be described. FIG. 2 provides a cut-away sectional view of a distillation column 20 being used for purification of polymerizable material. The distillation column 20 has a wall 22, a distillation tray 23, and a pressure relief device assembly 21. The pressure relief device assembly 21 comprises a rupture panel 24 having a rectangular cross-section and the pressure relief device assembly 21 is affixed to the wall 22 proximate to the distillation tray 23. A rectangular mount (not shown) is used to position the rupture panel 24, flush to wall 22, in an arc that substantially commensurate with the radius of curvature of the wall 22. The vertical center VCP of the rupture panel 24 is positioned at a vertical mounting elevation C equal to about 25% of the tray spacing (not shown, but see FIG. 1), as measured upward from the distillation tray 23.

In some embodiments, the pressure relief device assembly may comprise both a rupture disk and a downstream relief valve, separated by a short pipe spool. The placement of the rupture disk upstream of the relief valve serves to minimize potential fugitive emissions should the relief valve fail to maintain a seal under normal operating conditions. Such a pressure relief device assembly may also comprise means for pressure measurement, such as for example a pressure gauge connected to the pipe spool; this provides an indication of a pressure change between the rupture disc and the relief valve, thereby signaling when the rupture disc has burst and when replacement is required. Such a pressure relief device assembly configuration is common in industry and is exemplified, for example, in FIG. 3 of U.S. Pat. No. 6,983,758, which is hereby incorporated by reference.

Figure 3:
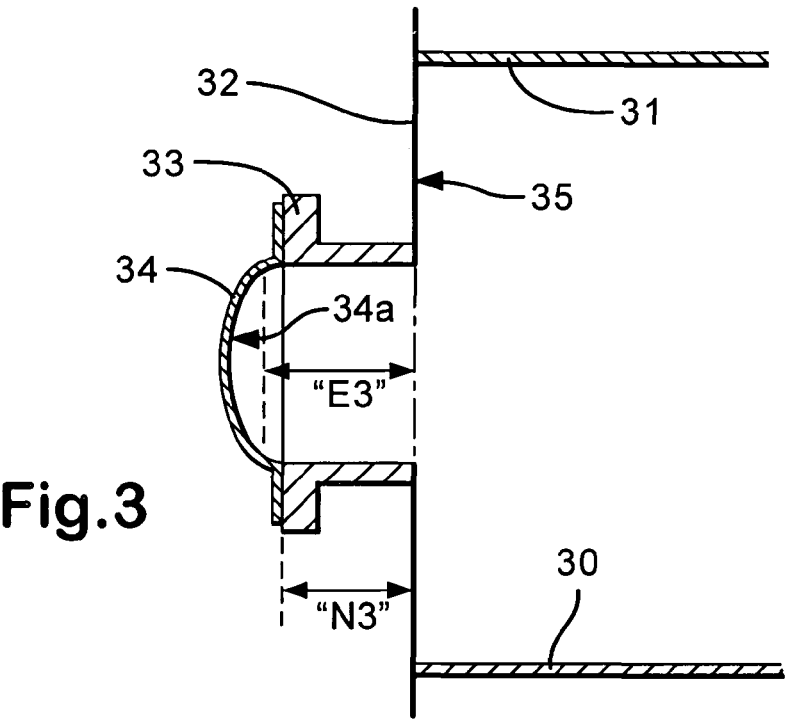
FIG. 3 is a schematic, cross-sectional elevational side view of one possible orientation of the rupture disk, having a protruding portion, relative to a mounting connection, in accordance with the present invention.
Figure 4:
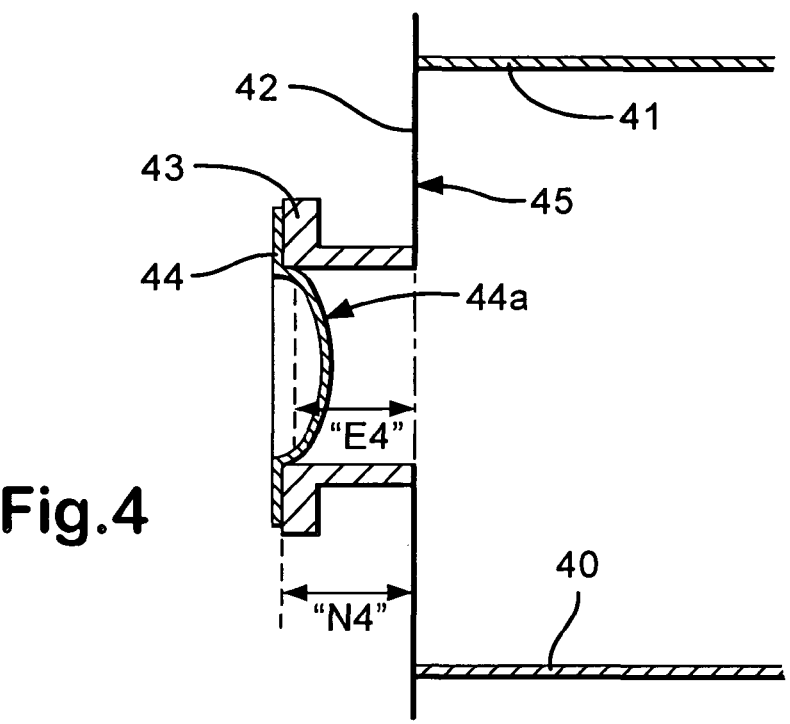
FIG. 4 is a schematic, cross-sectional elevational side view of an alternate orientation of the rupture disk, having a protruding portion, relative to a mounting connection, in accordance with the method of invention.

With reference to FIGS. 3 and 4, even when the mounting connection 33, 43 and safety device assembly (not completely shown in FIGS. 3 and 4, respectively) are properly positioned according to the present invention as discussed above, i.e., at a vertical position that places the safety device (34, 44) within a wetted region (not shown) of the process, the moving liquid phase fluid may still not easily and sufficiently contact the safety device and displace, or wash, polymer and condensate accumulated thereon. This situation typically occurs, for example, where the mounting connection 33, 43, and safety device assembly (not completely shown) are configured such that the safety device is in a recessed position relative to the vessel wall 32, 42 (see the rupture disks 34, 44 in FIGS. 3 and 4, respectively). This arrangement increases the average effective distance (E3 and E4, respectively, in FIGS. 3 and 4) that the moving liquid phase fluid must flow, or travel, in order to contact the safety device and displace unwanted polymer and condensate. As used herein, the term "average effective distance" means the average linear distance between the upstream surface of a relief device and the interior surface of the vessel wall to which the mounting connection and relief device are affixed. For example, FIG. 3 shows the average effective distance E3 between the upstream surface 34a of the rupture disk 34 and the interior surface 35 of the vessel wall 32. Similarly, FIG. 4 shows the average effective distance E4 between the upstream surface 44a of the rupture disk 44 and the interior surface 45 of the vessel wall 42.

Some types of safety devices, such as rupture disks 34, 44, are shaped such that a portion of the safety device may extend (or protrude) either away from the mounting connection (see concave rupture disk 34 in FIG. 3) or toward the mounting connection and the vessel (see convex rupture disk 44 in FIG. 4). In such situations, the average effective distance may be minimized and, therefore, the method and apparatus of the present invention may be further improved, by positioning and connecting the safety device 44 to the safety device assembly (not completely shown) and mounting connection 43 such that a portion of the safety device 44 protrudes toward the mounting connection 33. This orientation and positioning of the safety device 44, is demonstrated by the elevated, cut away view of FIG. 4, showing the minimized average effective distance E4 between the inner surface 45 of the vessel wall 42 and the upstream surface 44a safety device 44.

The average effective distance E3, E4 and the standard nozzle projection N3, N4 of the mounting connection 33, 43 may not be commensurate, as is shown schematically, in FIGS. 3 and 4. More particularly, as can be seen in FIG. 3, in some embodiments of the present invention, the average effective distance E3 may be slightly greater that the standard nozzle projection N3. In FIG. 3, the mounting connection 33 is connected to the vessel wall 32 of a distillation at a position between two adjacent distillation trays 30 and 31. The nozzle projection N3 is approximately 6 inches (15.24 centimeters), and the average effective distance E3 is approximately 7 inches (17.78 centimeters). In this arrangement, E3 is greater than N3 because the upstream surface 34a of the rupture disk 34 is concave (i.e., curves away from the mounting connection 33).

In FIG. 4, the average effective distance E4 between the upstream surface 44a of the rupture disk 44 is less than the standard nozzle projection N4. The mounting connection 43 is attached to the vessel wall 42 at a position between two adjacent distillation trays 40, 41. The nozzle projection N4 is approximately 6 inches (15.24 centimeters) and the average effective distance E4 is about 5 inches (12.70 centimeters). As is apparent from FIG. 4, E4 is less than N4 because the upstream surface 44a of the rupture disk 44 is convex (i.e., curves toward the mounting connection 43. Comparison of FIGS. 3 and 4, along with the foregoing discussion, demonstrates that one possible method for minimizing the average effective distance E3, E4 is to connect a rupture disk 34, 44 such that its upstream surface 34a, 44a is convex relative to the mounting connection 33, 43.

Alternatively, a studding outlet (not shown, conventional connecting means which is well-known to persons of ordinary skill in the relevant art) may be utilized as the mounting connection rather than a standard flanged nozzle (see mounting connection 15, 33, 43 in FIGS. 1, 3 and 4, respectively) to minimize the nozzle projection (e.g., N3, N4 of FIGS. 3 and 4, respectively), and thereby also minimize the average effective distance (e.g., E3, E4 of FIGS. 3 and 4, respectively) between the inner surface 35, 45 of the vessel wall 32, 42 and the upstream surface 34a, 44a of the safety device 34, 44. For example, a 3-inch 150# (7.62-centimeter 10.2 atmospheres) studding nozzle, having a nozzle projection N of about 1.5 inches (3.81 centimeters) may be utilized as a mounting connection rather than a 3-inch 150# (7.62 centimeters 10.2 atmospheres) flanged nozzle, which has a nozzle projection of 6 inches (15.24 centimeters). In this way, regardless of the orientation of the rupture disk 34, 44 (i.e., concave or convex), the average effective distance may be minimized.

Figure 6:
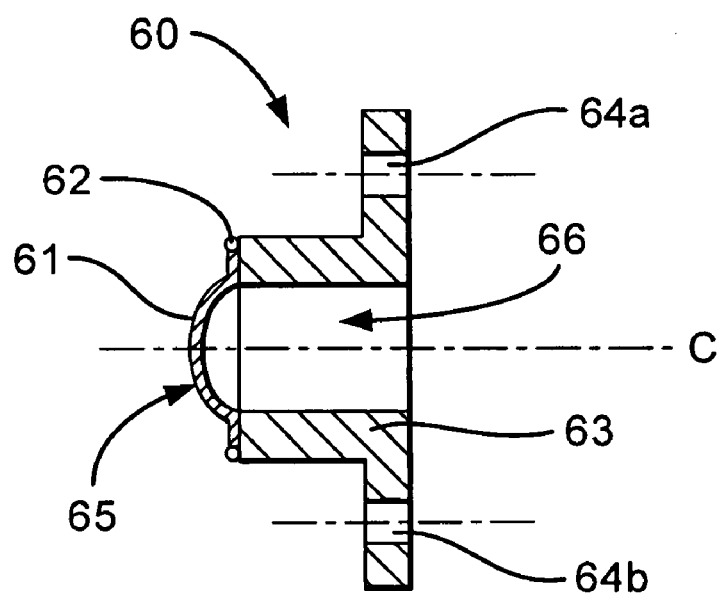
FIG. 6 is a schematic, cut away elevational side view of a mounting connection and safety device oriented and ready for connection to a distillation column, in accordance with the present invention as discussed in Example 1.
Figure 7:
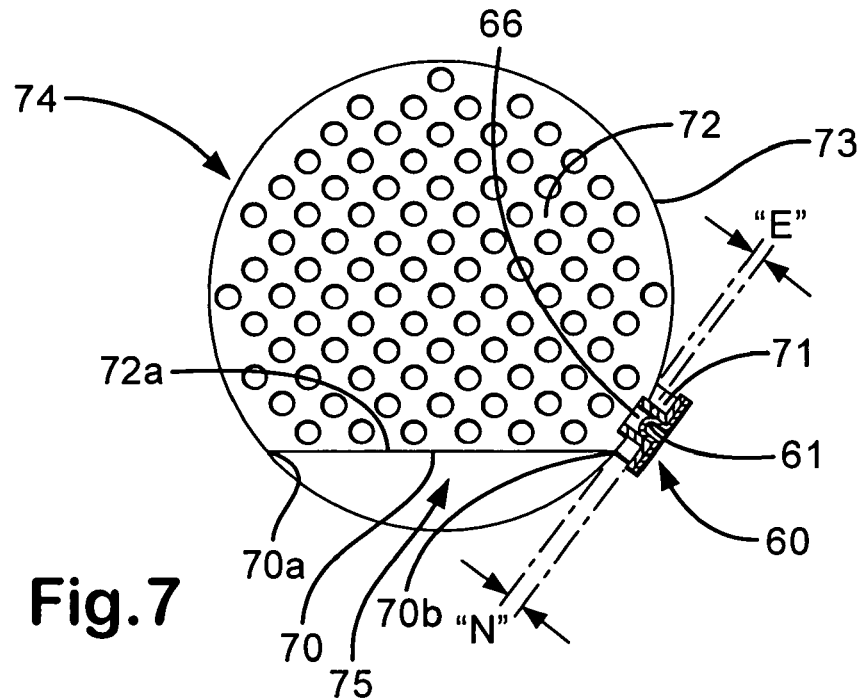
FIG. 7 is a schematic, cut away, partial top plan view of the mounting connection and safety device of FIG. 6 (Example 1) connected to the wall of a distillation column, and showing a distillation tray with downcorner forming a chimney opening, and the position of the mounting connection and safety device relative to the chimney opening.

As shown in FIGS. 6 and 7, which are discussed in further detail hereinafter with Comparative Example 1, mounting connection inserts may be utilized and connected to the vessel wall along with the mounting connection, thereby reducing the nozzle projection and resulting in an average effective distance which is less than the nozzle projection. The mounting connection inserts may be permanently attached (by welding, for example) to the mounting connection or they may be removably attached. Generally, the exterior surface of the mounting connection insert is substantially the same shape as the inside of the mounting connection, to minimize voids which might allow the accumulation of polymer. Thus, if the inside of the mounting connection is substantially circular, a cylindrically-shaped mounting connection insert would be preferred. Similarly, where the mounting connection is be substantially round and comprises a helical recess on its interior face, the optional mounting connection insert would be a cylinder with a complimentary raised helical ridge, which allows the mounting connection insert to be threaded into the mounting connection. In cases where the mounting connection is substantially rectangular in shape, the optional mounting connection insert would be similarly rectangular.

Figure 9:
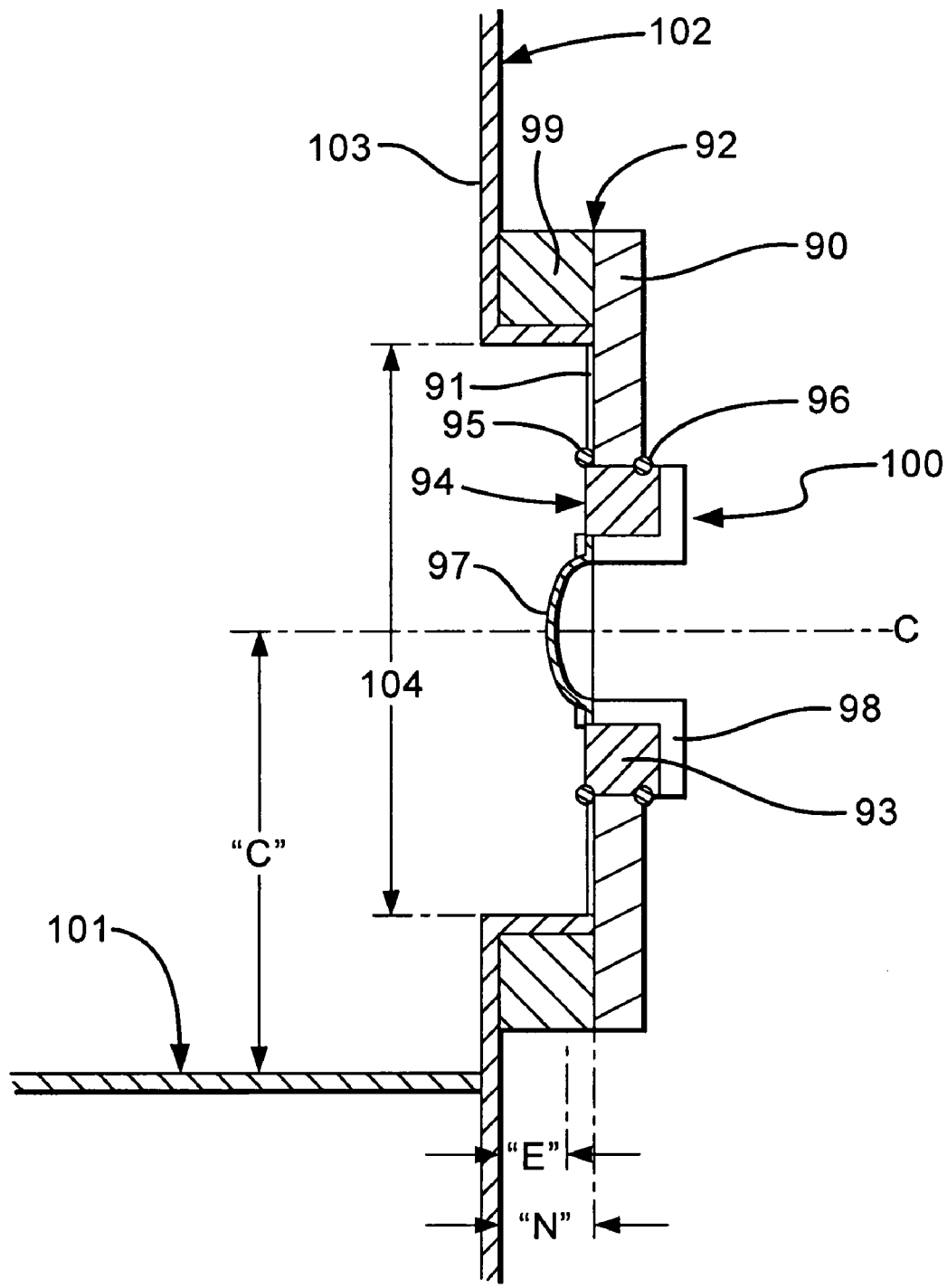
FIG. 9 is a sectional view of a manway, mounting connection, and rupture disk, illustrating the inventive embodiment of Example 2.

In an alternative embodiment of the present invention, as shown in FIG. 9, where the distillation column 102 comprises a column access manway for physical access to the column interior by personnel, an optional torroidal plate 91 may be used as a mounting connection insert. As is well-known in the art, a column access manway comprises a substantially circular manway opening 104 of between about 18 and 36 inches (45.72 and 91.44 centimeters) diameter and comprises a circular manway cover 90 having a diameter slightly larger than the diameter of the circular manway opening 104. The torroidal plate 91 should have an outer diameter equal to the internal diameter of the circular manway opening 104 and may be welded directly to the interior face of the manway cover 90. The torroidal plate 91 serves the dual-purpose of reducing the void volume within the mounting connection and also preventing the manway cover from coming into direct contact with the process fluid. This configuration minimizes polymer accumulation on the safety device attached to the mounting connection. Equipment costs may also be reduced by constructing the manway cover of an inexpensive material, such as for example carbon steel, while only the torroidal plate 91 and the pressure relief device 97 are made of a more costly corrosion-resistant alloy material. Typically, when a torroidal plate 91 is used as the mounting connection insert, the plate 91 is not less than 0.125" (0.32 cm) thick and may be 0.25 inch (0.64 centimeter), 0.375 inch (0.95 centimeters), 0.5 inch (1.27 centimeters) or even greater in thickness. Alternatively, a thicker manway cover 90 may be fabricated with a second, inner diameter (not shown) equivalent to manway internal diameter 104, such that the mounting connection insert is an integral part of manway cover 90 and, thus, a separate torroidal plate would not be required. Such an alternative embodiment would be preferred when a connection insert portion of greater than 0.75 inches (1.91 cm) equivalent thickness is desired.

It is easily envisioned that any of the previously-described methods and equipment may be combined to achieve minimization of the average effective distance (e.g., E3, E4 in FIGS. 3 and 4, respectively).

As is well within the ability of persons or ordinary skill in the relevant art, in accordance with the present invention, the type and size of the mounting connection and other features may be selected such that the nozzle projection N is, for example, without limitation, less than about 12 inches (30.48 centimeters), or less than about 9 inches (22.86 centimeters), or less than about 6 inches (15.24 centimeters), or even less than about 3 inches (7.62 centimeters).

Similarly, the type and size of the mounting connection and other features may be selected such that the average effective distance is, for example without limitation, less than 6 inches (15.24 centimeters). Alternatively, the average effective distance may be less than 4 inches (10.16 centimeters), or less than 2 inches (5.08 centimeters), or even less than 1 inch (2.54 centimeters).

Persons of ordinary skill will easily recognize the need to select suitable materials of construction for one or more of the pressure relief device assembly, mounting connection, and mounting connection insert, and it is believed to be well within the ability of persons of ordinary skill in the art to select suitable materials based upon the particular process to be operated. For example, without limitation, at least one of the pressure relief device assembly, mounting connection, and mounting connection insert may, as appropriate, comprise materials of construction selected from the group consisting of nickel alloys, stainless steel, monel, inconel, and other corrosion resistant materials comprising one or more elements selected from the group consisting of molybdenum, chromium, nitrogen, and tantalum. Furthermore, one or more of these pieces of equipment may comprise copper to enhance resistance to polymer accumulation thereon.

One or more of the pressure relief device assembly, the mounting connection, and the mounting connection insert may comprise materials that have been optionally smoothed to enhance resistance to polymer accumulation thereon. For example, it is possible to employ mechanical polishing methods, typified by buffing (buff finishing) and electrolytic polishing methods, which make possible a high degree of smoothing. In one embodiment, for example, surfaces of these apparati may have a surface roughness of 12.5s or less, more preferably 6.3s or less, most preferably 3.2s or less, to minimize polymer accumulation. The term "surface roughness" and the symbol "s" are based on Japanese Industrial Standards (JIS) B0601, and the s-value corresponds to the maximum value of the maximum heights (micrometers) of the surface irregularities.

Moreover, selection of rupture disks, gaskets and other equipment, including the type and material of construction, is also believed to be well within the ability of persons of ordinary skill in the relevant art, based upon the nature and conditions of the process to be operated. For example, the pressure relief device assembly may comprise membrane seal type rupture disks, but it is not recommended that seal rupture disks made of polytetrafluoroethylene (often abbreviated to PTFE, and available from DuPont under the trademark TEFLON®) be used for use in processes involving acrylic ester (e.g., ethyl acrylate), or methacrylic ester (e.g., methyl methacrylate), because (meth)acrylic esters tend to permeate PTFE over time, which allows polymer to form and accumulate on the rupture disk which, in turn, prevents the rupture disk from functioning properly. Similarly, gaskets comprising PTFE are not recommended for use in forming pressure-tight seals when acrylic esters or methacrylic esters are being distilled. When (meth)acrylic esters are being distilled, it is preferred that graphite-coated stainless steel gaskets be used. Graphite-coated stainless steel gaskets may, of course, also be used in the distillation of (meth)acrylic acids. Suitable gaskets comprising 300-series stainless steel are commercially available from JM Clipper Corp of Nacogdoches, Tex., under the tradenames ELASTOGRAPH™ and DYNAGRAPH™. It is noted that when the process is a hydrogen cyanide production and purification process, it is recommended to use gaskets made of spiral-wound graphite-coated steel, available under the registered trademark FLEXITALLIC® from Flexitallic Gasket Company of Camden, N.J.

As is well known in the art, polymerization inhibitors may be added to distillation columns when purifying polymerizable monomers. Water-soluble or organic-soluble polymerization inhibitor may be beneficially employed in combination with the method of the present invention. Examples of suitable polymerization inhibitors include, but are not limited to: hydroquinone (HQ); 4-methoxyphenol (MEHQ);

4-ethoxyphenol; 4-propoxyphenol; 4-butoxyphenol; 4-heptoxyphenol; hydroquinone monobenzylether; 1,2-dihydroxybenzene; 2-methoxyphenol; 2,5-dichlorohydroquinone; 2,5-di-tert-butylhydroquinone; 2-acetylhydroquinone; hydroquinone monobenzoate; 1,4-dimercaptobenzene; 1,2-dimercaptobenzene; 2,3,5-trimethylhydroquinone; 4-aminophenol; 2-aminophenol; 2-N,N-dimethylaminophenol; 2-mercaptophenol; 4-mercaptophenol; catechol monobutylether; 4-ethylaminophenol; 2,3-dihydroxyacetophenone; pyrogallol-1,2-dimethylether; 2-methylthiophenol; t-butyl catechol; di-tert-butylnitroxide; di-tert-amylnitroxide; 2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-amino-2,2,6,6-tetramethyl-piperidinyloxy; 4-ethanoloxy-2,2,6,6-tetramethyl-piperidinyloxy; 2,2,5,5-tetramethyl-pyrrolidinyloxy; 3-amino-2,2,5,5-tetramethyl-pyrrolidinyloxy; 2,2,5,5-tetramethyl-1-oxa-3-azacyclopentyl-3-oxy; 2,2,5,5-tetramethyl-3-pyrrolinyl-1-oxy-3-carboxylic acid; 2,2,3,3,5,5,6,6-octamethyl-1,4-diazacyclohexyl-1,4-dioxy; salts of 4-nitrosophenolate; 2-nitrosophenol; 4-nitrosophenol; copper dimethyldithiocarbamate; copper diethyldithiocarbamate; copper dibutyldithiocarbamate; copper salicylate; methylene blue; tetramethyl thionine sulfate; iron; phenothiazine (PTZ); 3-oxophenothiazine; 5-oxophenothiazine; phenothiazine dimer; 1,4-benzenediamine; N-(1,4-dimethylpentyl)-N'-phenyl-1,4-benzenediamine; N-(1,3-dimethylbutyl)-N'-phenyl-1,4-benzenediamine; N-nitrosophenyl hydroxylamine and salts thereof, nitric oxide; nitrosobenzene; p-benzoquinone; or isomers thereof, mixtures of two or more thereof, mixtures of one or more of the above with molecular oxygen. The inhibitor(s) may be used alone or combined with suitable diluents. Selection of one or more suitable inhibitors is well within the ability of persons of ordinary skill in the relevant art.

Additional process equipment may also be incorporated into the pressure relief device assembly without deviating from the scope of the present invention. For example, jacking studs can be added to the pressure relief device assembly to improve ease of removal from the mounting connection, and burst indicators may be added to rupture disks. Tracing and insulation may also be utilized to maintain pressure relief device assemblies, mounting connections, and distillation column walls at a temperature above the dewpoint of the polymerizable materials used in the process. Additionally, equipment such as tail pipes, catch tanks, or thrust plates may be optionally added downstream of the pressure relief device assembly to manage effluent discharge.

COMPARATIVE EXAMPLE 1

Figure 5:
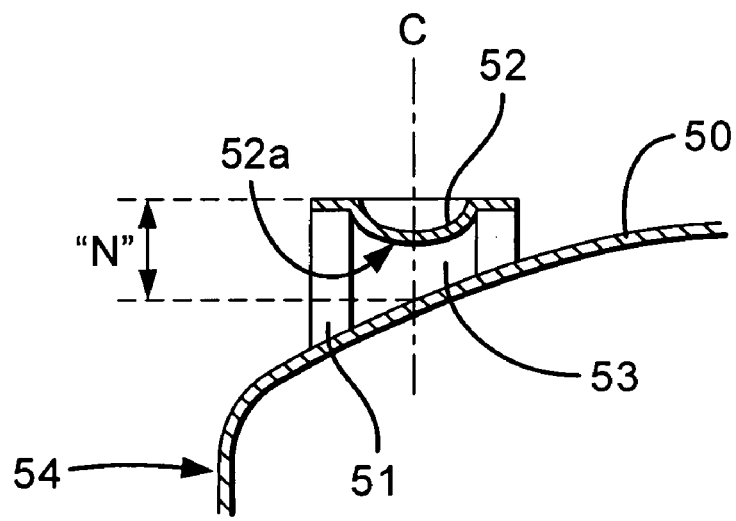
FIG. 5 is a schematic, cut-away side view of a portion of a distillation column and safety device, showing the relative orientation and positioning of the safety device in accordance with the prior art, as discussed in Comparative Example 1.

FIG. 5 (Prior Art) provides a schematic cut-away view of the original, prior art arrangement of safety device equipment with a distillation column, which did not conform to the method or apparatus of the present invention. Acrylic acid was purified in the presence of polymerization inhibitors and oxygen in a commercial-scale distillation column 54 (only a top portion of which is shown in FIG. 5). The distillation column was designed to operate at sub-atmospheric pressure and comprises 13 perforated plate trays, with a tray spacing of 27 inches (68.58 centimeters). Each tray was a perforated plate with downcorner, specifically, a sieve tray, each of which comprises an adjustable weir, with a weir height of between 1.5 and 2.0 inches (3.81 and 5.08 centimeters). The typical operating pressure was about 35 mmHg and the temperature was between 55° C. and 65° C., both measured in the top head portion, above the topmost tray, of the distillation column 54.

With continued reference to FIG. 5, a reverse buckling rupture disc 52 was connected in a pressure-tight manner to a mounting connection 53, which was, in turn, affixed to the vessel wall 50 of the distillation column 54 on the top head portion of the column (only a portion of which is shown in FIG. 5). The rupture disc 52 has a nominal burst pressure of 25 pounds per square inch gauge ("psig") (1.7 atmospheres), and is rated for full vacuum operation. The mounting connection 51 was a 6 inch, 150# grade (an American Society of Mechanical Engineers standard) raised-face studding outlet ("RFSO"), which provided an average nozzle projection N of about 2.75 inches (6.99 centimeters) relative to the sloped vessel wall 50 at the top head of the distillation column 54. As can be seen in FIG. 5, the rupture disk 52 and the mounting connection 53 were both positioned in a substantially horizontal orientation, with the rupture disk 52 in close proximity to the vessel wall 50. Thus arranged, neither the mounting connection 51 nor the rupture disk 52 was within the wetted region above the topmost tray (not shown) in the distillation column 54.

With the rupture disc 52 oriented as shown (convex upstream surface, similar to the disk 44 in FIG. 4) the resulting average effective distance was less than about 2 inches (5.08 centimeters), however, a low-flow region 53 formed in the interior of the studding outlet, adjacent to the rupture disc 52, which meant that the process fluid was much less likely to contact the upstream surface of the rupture disk 52 and wash away polymer and condensate. As a result of this configuration, during routine operation of the distillation column 54, vapor phase fluid comprising polymerizable monomer is allowed to enter the interior of the mounting connection 51 and condense and form polymer on, and proximate to, the upstream surface 52a of the rupture disc 52. This recurring polymer accumulation rendered the rupture disc ineffective in providing the desired level of protection against dangerously high operating pressure that is necessary for safe long-term operation of the distillation column.

EXAMPLE 1

A pressure relief device was installed, in accordance with the present invention, in a commercial-scale distillation column comparable design to Comparative Example 1 and the column was again used in a process for purification of acrylic acid. As in Comparative Example 1, the pressure relief device was a rupture disc having a nominal burst pressure of 25 psig (1.7 atmospheres) and full-vacuum rating.

With reference collectively to FIGS. 6 and 7 the safety device assembly 60 having a rupture disk 61 was connected to the column wall 73 of the distillation column 74, in accordance with the method and apparatus of the present invention (see FIG. 7). More particularly, the safety device assembly 60 was positioned relative to the topmost tray 72, in a substantially vertical orientation, and at an elevation within the wetted region (not shown) present above the topmost tray 72. In this position and orientation of the safety device assembly 60, the froth/liquid spray (liquid phase fluid) present above the topmost tray 72 intermittently contacted the upstream surface 65 of the rupture disc 61 in the safety device assembly 60 (see FIGS. 6 and 7), thereby preventing accumulation of unwanted polymer and condensate.

With reference to FIG. 6, this pressure relief device assembly 60 comprised a 6-inch (15.24-centimeter) diameter, reverse buckling rupture disc 61, attached by means of a circumferential weld 62 to an optional flanged 316L stainless steel mounting connection insert 63 for connection to a mounting connection (not shown in FIG. 6, but see feature 71 in FIG. 7). The specific rupture disc 61 that was used was an inconel 600, model A 8876-X disc, manufactured by Fike Corporation of Blue Springs, Mo., USA. As can be seen in FIGS. 6 and 7 collectively, the mounting connection insert 63 had at least two bolt holes 64a, 64b for attachment to the mounting connection 71 which was then connected to the column wall 73.

As shown in the schematic partial cut away top view of FIG. 7, the safety device assembly 60 was mounted to the column wall 73 and positioned relative to the tray 72 such that, during operation of the distillation column 74, liquid phase fluid (not shown) present in the distillation column 74 above the tray 12 intermittently contacted the upstream, convex surface 65 of the rupture disc 61 in the safety device assembly 60.

With reference still to FIG. 7, the trays (only one tray 72 shown) were sieve trays, also known commonly in the art as "perforated plates with downcomers". Each sieve tray 72 had a vertically oriented plate 70 affixed to a straight cut edge 70a of the sieve tray 72, at approximately a right angle relative to the horizontal plane of the sieve tray 72 such that the lower portion of the vertically-oriented plate 70 extended below the horizontal plane of the tray 72 and the upper portion extended above the horizontal plane of the tray 72. Common practice in the art is to refer to the lower portion of the plate 70 as the "downcorner", and the upper portion of the plate 70 as the "weir" (the downcorner and weir are not independently visible from the top view shown in FIG. 7).

As is the common practice, the vertical sides 70a, 70b of the vertically-oriented plate 70 were affixed to the column wall 73. The plates 70 of all the trays 72 in the column 74 were vertically aligned and collectively formed a vertically-oriented chimney space 75. During operation of the distillation column 74, the tray liquid 12 accumulated and overflowed the weir 70 and then flowed into the chimney space 75 and down the column 74. When the tray liquid 12 flows downward through the chimney space 75, a moving liquid phase fluid and a wetted region are present in the chimney space 75, resulting in creation of a suitable alternative location at which to position and affix a safety device assembly 60.

With reference back to the particular embodiment of Example 1 shown in FIGS. 6 and 7, the outlet opening 66 of the mounting connection 71 and safety device assembly 60 was positioned on the column wall 73 outside the chimney space 75 (see FIG. 7) to take advantage of the wetted region above the tray 72. The centerline C of the outlet opening 66 of the safety device assembly 60 was positioned at an elevation of about 12 inches (30.48 centimeters) above the upper surface of the topmost tray 72, which was noted to be, in this case, equal to about two times the diameter of the mounting-connection 71 above the upper surface of the tray 72 (2D=2× 6=12 inches (30.48 centimeters)). The pressure relief device assembly 60 was connected to a substantially vertical mounting connection 71, to provide a pressure-tight seal. The mounting connection 71 comprised a 6 inch (15.24 centimeters), 150# raised face studding outlet nozzle, which provided a minimal nozzle projection N of about 2 inches (5.08 centimeters).

Alternatively, the mounting connection 71 and the centerline C of the outlet opening 66 of the safety device assembly 60 may be positioned and affixed to the column wall 73, within the chimney space 75, to allow at least intermittent contact between the safety device assembly 60 and the moving liquid phase fluid in the chimney space 75. However, as will be recognized by persons of ordinary skill in the art, the height above the tray 72 at which the safety device assembly 60 should be affixed will be different, and likely lower, that that which was appropriate when the safety device assembly 60 was positioned and affixed to the column wall 73 outside the chimney space 75.

As mentioned above and shown in FIG. 6, the pressure relief device assembly 60 of this embodiment comprised an optional mounting connection insert 63. The specific mounting connection insert 63 was cylindrical, and had an extension length (commensurate with the nozzle projection N) of about 2 inches (5.08 centimeters) and an outside diameter substantially the same as the inside diameter of circular mounting connection 71. Thus, the mounting connection insert 63 lessens the depth of the low-flow region in the interior of the studding outlet nozzle, beneficially reducing the volume available for accumulation of polymer and condensate. Thus, although the nozzle projection N of the mounting connection 71 is about 2 inches (5.08 centimeters), the resulting average effective distance E in this embodiment was less than about 1 inch.

After the pressure relief device assembly 60 was installed, acrylic acid was purified in the distillation column in the same manner as in Comparative Example 1. After 40 days, operation of the distillation column was interrupted and the pressure relief device assembly 60 was removed for inspection. The upstream face 65 of the rupture disc 61 was substantially free of polymer and condensate, demonstrating that the method and apparatus of the present invention effectively removed accumulated polymer and condensate from the rupture disk 61. Thus, the method and apparatus of the present invention effectively maintained the service-readiness of the rupture disk 61, and provided for safe long-term operation of the distillation column.

COMPARATIVE EXAMPLE 2

Figure 8:
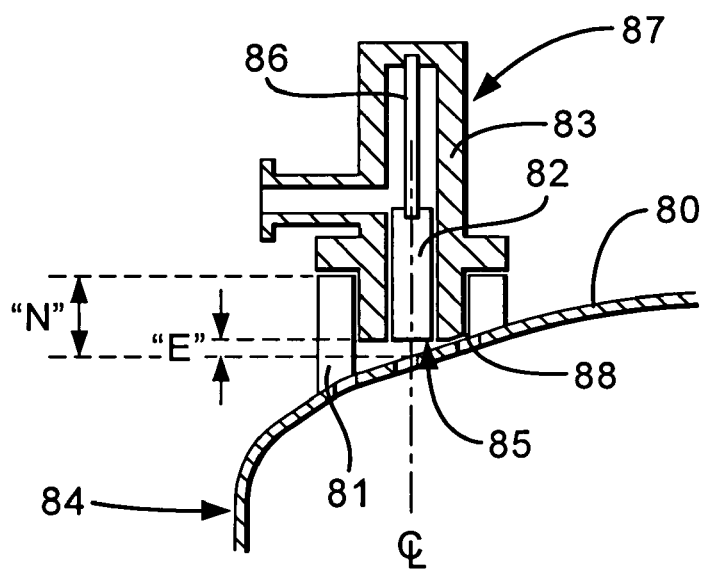
FIG. 8 is a schematic partial cut-away side view of a mounting connection and a different type of safety device, i.e., a rupture pin relief valve, and their orientation and position relative to a distillation column according to the prior art, as discussed in Comparative Example 2.

FIG. 8 (Prior Art) provides a schematic partial cut-away side view of the original, prior art arrangement of another type of safety device equipment with a distillation column, which arrangement did not conform to the method or apparatus of the present invention. Acrylic acid was purified in the presence of polymerization inhibitors and oxygen in a commercial-scale distillation column 84 (only a top portion of which is shown in FIG. 8). The distillation column was designed to operate at sub-atmospheric pressure and comprised 35 perforated plate trays (not shown), with a tray spacing of 27-inches (68.58 centimeters). Each tray was specifically a dual-flow tray and, therefore, did not comprise weirs or downcomers. The typical operating pressure was about 35 mmHg and the temperature was between 55° C and 65° C, both measured in the top head portion, above the topmost tray, of the distillation column 84.

With continued reference to FIG. 8, the safety device was a rupture pin relief valve ("RPR valve") 87, commercially available from Rupture Pin Technology of Oklahoma City, Oklahoma, Okla., and intended to open if dangerously high pressure developed within the distillation column 84. The specific RPR valve 87 employed was a 316 stainless steel, 8" model CM with a nominal set pressure of 15 psig (1 atmopshere) and full vacuum rating. As persons of ordinary skill are likely already aware, the RPR valve 87 comprises a body 83, with a plunger 82 and a buckling pin 86 arranged end to end in the body 83. In this embodiment, the RPR valve 87 was bolted to a mounting connection 81, in a substantially horizontal orientation, to achieve a pressure-tight seal. Thus the upstream surface 85 of the plunger 82 was positioned in a substantially horizontal orientation on the top head of the distillation column 84, in close proximity to the vessel wall 80. In this position, the mounting connection 81 and the RPR valve 87 were not within the wetted region above the topmost tray. The mounting connection 81 comprised an 8 inch (20.32 centimeters) 150# raised face studding outlet, which provided an average nozzle projection N of about 2.75 inches (6.99 centimeters) relative to the sloped wall 80 of the top head portion of the distillation column 84. However, by utilizing this plunger-type RPR valve, it was possible to reduce the average effective distance E to about 0.6 inch (1.54 centimeters) and thereby minimize the volume in which polymer can accumulate. Unfortunately, during typical operation of the distillation column 84 to purify acrylic acid, some polymer accumulation still occurred proximate the upstream face 85 of the plunger 82, thereby restricting the ability of the RPR valve safety device 87 to provide the desired protection against dangerously high operating pressure that is necessary for safe long-term operation of the distillation column 84. More significantly, polymer accumulation in the annular space 88 between the RPR valve body 83 and the interior surface of the mounting connection 81 caused removal of the RPR valve, for inspection and cleaning, to be extremely difficult and costly. Without the ability to easily remove and clean the RPR valve, the safe long-term operation of the distillation column 84 could not be assured.

EXAMPLE 2

A pressure relief device was installed, in accordance with the present invention, in a commercial-scale distillation column of comparable design to Comparative Example 2 and the column was again used in a process for purification of acrylic acid. The pressure relief device was a rupture disc having a nominal burst pressure of 15 psig (1 atmosphere) and full-vacuum rating.

With reference to FIG. 9, the safety device assembly was connected and positioned relative to the distillation column in accordance with the present invention, i.e., in a substantially vertical orientation, and at an elevation within the vertical extent W of the wetted region above the topmost tray of the distillation column, such that the froth/liquid spray (liquid phase fluid) present above the topmost tray intermittently contacted the upstream surface of the rupture disc, thereby preventing accumulation of unwanted polymer and condensate.

As shown schematically in FIG. 9, the distillation column 102 had a manway opening 104 through the column wall 103 for allowing a person to physically gain access to the interior of the column 102. The safety device assembly 100 (described in further detail hereinafter) was connected to a 150# (10.2 atmospheres), 24-inch (60.96-centimeter) carbon steel manway cover 90 which was specially-modified and affixed to the distillation column 102 to cover the manway opening 104. More particularly, a 24-inch (60.96-centimeter) diameter, 0.375 inch (0.95-centimeter) thick, 316 stainless steel circular insert plate 91 was centered on the interior face of the manway cover 90 and circumferentially welded to the manway cover 90. Since the external diameter of a nominal 24-inch (60.96-centimeter) diameter manway opening 104 is actually about 30.5 inches (77.47 centimeters) in diameter, the concentric placement of the plate 91 results in formation of an approximately 3 inch (76.2 centimeters) wide torroidal recess 92 proximate to the outer edge of the manway cover 90. The recess 92 was the gasketting surface for the manway opening.

A 13.5 inch (34.29 centimeter) diameter concentric hole was then cut through manway cover 90 and insert plate 91. A mounting connection 93, comprising an 8 inch (20.32 centimeter), 150# raised face studding outlet nozzle, was inserted into the aforesaid hole in the manway cover 90 and positioned such that the interior face 94 of the mounting connection 93 was flush with the interior face of plate 91. A first circumferential weld 95 was made between the mounting connection 93 and the plate 91. This resulted in the interior face 94 of mounting connection 93 being substantially planar with the interior surface of plate 91, and so the projection of the studding outlet 93 relative to plate 91 was effectively zero. A second circumferential weld 96 was made between mounting connection 93 and the exterior face of manway cover 90.

The pressure relief device assembly 100 used in this example was similar in configuration to the type illustrated in FIG. 6, but in this case comprised an 8 inch (20.32-centimeter) diameter, reverse buckling rupture disc 97, attached by means of a circumferential weld (not shown) to a flanged, cylindrical mounting connection insert 98. The specific rupture disk 97 used in this example was an 8-inch (20.32-centimeter) model PLR, 316 stainless steel rupture disk manufactured by Oseco of Broken Arrow, Okla.

The mounting connection insert 98 was constructed of 316 stainless steel and had an overall extension length of about 3 inches (7.62 centimeters) and an outside diameter of about 9.9 inches (25.15 centimeters), which is substantially the same as the inside diameter of the circular mounting connection 93. In this configuration, the insert 98 can fill the low-flow region in the interior of the studding outlet nozzle 93, beneficially reducing the available volume in which condensate and polymer may otherwise tend to accumulate. The pressure relief device assembly 100 was bolted to mounting connection 93, to provide a pressure-tight seal.

The manway cover 90 was then connected, by bolting to form a pressure-tight seal, with an existing 24-inch (60.96-centimeter) diameter studding outlet 99 on the distillation column wall. The use of the studding outlet 99 provides a minimal manway nozzle projection N of about 2.5 inches (6.35 centimeters) and the convex upstream surface of rupture disk 97 results in an average effective relief path E of less than 2 inches (5.08 centimeters).

Once installed, the centerline of the mounting connection 93 is positioned at a height C of 16 inches (40.6 centimeters) above the upper surface of the topmost tray 101. In this position, the centerline of the mounting connection 93 is located at an elevation equal to 2 mounting connection diameters (D=8 inches (20.3 centimeters)) above the upper surface of the tray (i.e., 2D=16).

After the pressure relief device assembly 100 was installed, acrylic acid was purified in the distillation column in the same manner as discussed above in Comparative Example 2. After 10 months, operation of the column was interrupted and the pressure relief device assembly 100 was removed for inspection. The area adjacent to rupture disc 97 was found to be free of polymer, demonstrating that the method and apparatus of the present invention effectively removed accumulated polymer and condensate from the rupture disk 97. Thus, the method and apparatus of the present invention effectively maintained the service-readiness of the rupture disk 97, and provided for safe long-term operation of the distillation column.

We claim:

1. A method for minimizing accumulation of polymer on equipment to be used with process apparatus to operate a process which comprises polymerizable material and at least one process fluid comprising a moving liquid phase fluid, wherein said process apparatus has at least one wall forming an interior space for retaining the at least one process fluid therein, and wherein said equipment comprises a safety device and is at least intermittently in contact with said polymerizable material, said method consisting essentially of:
   (a) locating a wetted region in which said moving liquid phase fluid is in motion in said interior space of said process apparatus, during operation of the process;
   (b) positioning and affixing said equipment to said wall of said process apparatus, in fluid communication with said interior space, and proximate to said wetted region whereby said moving liquid phase fluid at least intermittently contacts at least a portion of said equipment;
   (c) operating the process, whereby said moving liquid phase fluid washes one or more of accumulated polymerizable material, condensate comprising same, and polymer, off of said equipment, wherein said process is a process for producing polymerizable material which comprises polymerizable monomers.

2. The method of claim 1, wherein said safety device comprises at least one pressure relief device selected from the group consisting of: a rupture disk, a rupture panel, and a relief valve.

3. The method of claim 1, wherein said process apparatus comprises a separations vessel selected from the group consisting of a distillation column, an absorption column, an evaporator, reboiler, a conduit, a scrubber, and a vertical column.

4. The method of claim 1, wherein said polymerizable monomers comprise at least one monomer selected from the group consisting of: (meth)acrylic acid, vinyl chloride, (meth)acrylic acid esters, hydrogen cyanide, (meth)acrylonitrile, (methyl)styrene, vinyl monomers, and (meth)acrylic esters.

5. The method of claim 1, wherein said moving liquid phase comprises process fluid comprising polymerizable material.

* * * * *